United States Patent
Fröjdh et al.

(10) Patent No.: US 9,137,555 B2
(45) Date of Patent: Sep. 15, 2015

(54) CLIENT, A CONTENT CREATOR ENTITY AND METHODS THEREOF FOR MEDIA STREAMING

(75) Inventors: Per Fröjdh, Stockholm (SE); Torbjörn Einarsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/876,356

(22) PCT Filed: Oct. 3, 2011

(86) PCT No.: PCT/SE2011/051176
§ 371 (c)(1),
(2), (4) Date: Mar. 27, 2013

(87) PCT Pub. No.: WO2012/047158
PCT Pub. Date: Apr. 12, 2012

(65) Prior Publication Data
US 2013/0185756 A1 Jul. 18, 2013

Related U.S. Application Data

(60) Provisional application No. 61/389,884, filed on Oct. 5, 2010.

(51) Int. Cl.
*H04N 21/2387* (2011.01)
*H04N 19/31* (2014.01)
(Continued)

(52) U.S. Cl.
CPC ............ *H04N 21/2387* (2013.01); *H04N 19/30* (2014.11); *H04N 19/31* (2014.11);
(Continued)

(58) Field of Classification Search
CPC ..... H04N 19/30; H04N 19/31; H04N 19/503; H04N 21/2387
See application file for complete search history.

(56) References Cited

U.S. PATENT DOCUMENTS

| | | | |
|---|---|---|---|
| 2002/0168175 A1 | 11/2002 | Green et al. | |
| 2005/0286632 A1* | 12/2005 | Van Der Schaar et al. | 375/240.16 |

(Continued)

FOREIGN PATENT DOCUMENTS

| | | |
|---|---|---|
| JP | 2009506626 A | 2/2009 |
| WO | 03073768 A1 | 9/2003 |

(Continued)

OTHER PUBLICATIONS

Song, J. et al., "Response to Call for Proposals for HTTP Streaming of MPEG Media Standard", International Organization for Standardisation, Organisation Internationale De Normalisation, ISO/IEC JTC1/SC29/WG11, Coding of Moving Pictures and Audio, MPEG2010/M17779, 93rd MPEG Meeting, Jul. 26, 2010, pp. 1-60, MPEG, Geneva, Switzerland.

(Continued)

*Primary Examiner* — Robert Hance
(74) *Attorney, Agent, or Firm* — Coats & Bennett, P.L.L.C.

(57) ABSTRACT

The embodiments of the present invention relate to methods and arrangements for accomplishing trick modes. This is achieved by assigning samples within a track to sample groups, wherein all samples within a sample group belong to one temporal level and by allowing the client to access one temporal level independently of lower temporal levels. In this way, the flexibility for the client regarding play out of different frame rates is increased which can result in a lower bandwidth utilization.

14 Claims, 8 Drawing Sheets

(51) Int. Cl.
*H04N 19/30* (2014.01)
*H04N 19/503* (2014.01)
*H04N 21/2343* (2011.01)
*H04N 21/4402* (2011.01)
*H04N 21/6587* (2011.01)
*H04N 21/845* (2011.01)

(52) U.S. Cl.
CPC ...... *H04N 19/503* (2014.11); *H04N 21/23439* (2013.01); *H04N 21/440281* (2013.01); *H04N 21/6587* (2013.01); *H04N 21/8455* (2013.01); *H04N 21/8456* (2013.01)

(56) References Cited

U.S. PATENT DOCUMENTS

| | | | |
|---|---|---|---|
| 2006/0037057 A1 | 2/2006 | Xu | |
| 2006/0233247 A1* | 10/2006 | Visharam et al. | 375/240.12 |
| 2007/0014346 A1* | 1/2007 | Wang et al. | 375/240.1 |
| 2012/0023250 A1* | 1/2012 | Chen et al. | 709/231 |
| 2013/0125187 A1* | 5/2013 | Kim et al. | 725/109 |

FOREIGN PATENT DOCUMENTS

| | | |
|---|---|---|
| WO | 2004012037 A2 | 2/2004 |
| WO | 2007024232 A1 | 1/2007 |

OTHER PUBLICATIONS

Chen, Y. et al., "Response to the CfP on HTTP Streaming: Adaptive Video Streaming based on AVC", International Organization for Standardisation, Organisation Internationale De Normalisation, ISO/IEC JTC1/SC29/WG11, Coding of Moving Pictures and Audio, MPEG2010/M17909, 93rd MPEG Meeting, Jul. 26, 2010, pp. 1-19, MPEG, Geneva, Switzerland.

ISO/IEC, "Information technology—Coding of audio-visual objects—Part 12: ISO base media file format, Amendment 3: DASH support and RTP reception hint track processing", ISO/IEC JTC 1/SC 29/WG11, ISO/IEC 14496-12:2008/ FPDAM 3 & ISO/IEC 15444-12:2008/DAM 3, Jan. 28, 2011, pp. 1-42, STD Version 2.1c2, ISO, Geneva, Switzerland.

* cited by examiner

CLIENT, A CONTENT CREATOR ENTITY AND METHODS THEREOF FOR MEDIA STREAMING

TECHNICAL FIELD

The embodiments of the present invention relates to media streaming and in particular to accomplishing trick modes.

BACKGROUND

There is an increased interest in Hyper Text Transport Protocol (HTTP) streaming of media, in particular video. This has evolved beyond simple progressive download to give two new features: adaptivity and live content. The way this is achieved is that the content is partitioned into multiple segments, or files, each corresponding to a small interval of content, for example 10 seconds of content. The client is provided with a manifest file also known as a Media Presentation Description, (MPD) which lists the different segments and where to fetch them and the client fetches them one by one. The split into different segments/files that are fetched via a standard web protocol like HTTP, is also said to be cache-friendly, or Content Distribution Network (CDN) friendly, since it does not require any state in the server or cache, in contrast to streaming servers based on protocols like Real Time Streaming Protocol (RTSP).

3GPP has recently standardized a solution for HTTP Streaming called Adaptive HTTP Streaming (AHS) in Release 9 of PSS. An extended version is called 3GP-DASH (Dynamic Adaptive Streaming over HTTP) and is currently being specified in Release 10. The Motion Picture Experts Group (MPEG) is currently standardizing Dynamic Adaptive Streaming over HTTP (DASH) based on 3GPP AHS.

The AHS and DASH solutions, as well as other solutions for HTTP streaming use two different types of files that are fetched by the client from the server. The first type is a manifest describing the session, and in particular the different variants of the content that are available. In AHS and DASH the manifest is an MPD file and provides information about the different periods, and then the segments of the different representations of the media inside a period. The second type is the media itself, which is contained in media files. In AHS and DASH these are ISO (International Organization for Standardization) file-format based, and consist of initial segments and media segments.

In order to quickly navigate in a media it is common to allow for trick modes and alternate playout rates by fast forward or rewind, i.e., to play a representation of the media stream faster at a higher speed or even backwards. This way a user can visually search through the stream and start normal playback at a wanted position.

The simplest method of "fast forward" is to playback a stream at faster than its original rate. This method has the drawback of requiring a lot of processing power, as well as an increased download rate if the content is on a remote server. For example, to be able to fast forward at 10× speed, ten times the decoding complexity would be needed. FIG. 1 shows fast forward where the speed is two times the normal speed.

A simplified method of fast forward is to play back only the I-frames or more precisely, the Random Access Points (RAPs), i.e. the key frames. This reduces the complexity a lot depending on the distance between the I-frames. By decoding every second I-frame, it is possible to make a still faster trick-mode, but it is not easy to make a trick-mode corresponding to a fractional image distance, if the video is not encoded using temporal levels. FIG. 2 shows the jumping between I-frames to enable fast forward.

Another drawback of this solution is the high overhead (bandwidth demand) of this solution. The complete stream (all frames) must be sent to the receiver who filters and discards the "unwanted" frames (majority of frames).

The frames also referred to as samples can be divided into temporal levels. All samples within one temporal level can only depend on samples within the same temporal level or on samples within lower temporal levels. An example of a video codec that supports temporal levels is H.264 (MPEG-4 AVC), which is the state of the art of video coding standards. It is a hybrid codec which takes advantages of eliminating redundancy between pictures (using B and P pictures) in addition to redundancy within pictures.

H.264 supports several ways of restricting dependencies between pictures such that subsets of independent frames can be extracted from the bitstream and decoded without using any of the remaining pictures of the stream. One can for instance extract I frames, which in the case of a fixed Group of Pictures (GOP) structure will appear regularly in the media stream. Other options are to exploit hierarchical B and/or P pictures to extract a temporal level of the media stream.

An example of temporal scalability coding structure is shown in FIG. 3. In FIG. 3 pictures (I, P and B) are indexed with their level 0, 1, 2 or 3. It is shown that samples within one temporal level only depend on samples within the same temporal level or on samples within lower temporal levels.

Accordingly, different fast forward (ff) speeds (times normal playout) can be obtained as follows:
ff x8 is achieved by using pictures of level 0,
ff x4 is achieved by using pictures of levels 0 and 1,
ff x2 is achieved by using pictures of levels 0, 1 and 2,
normal playback corresponds to all levels 0, 1, 2 and 3.

3GPP and MPEG base their HTTP Streaming delivery formats on the 3GP file format and the MP4 file format, respectively, which in turn are based on the ISO base media file format.

The file structure of a 3GP or MP4 file is object-oriented and a file is formed by a series of objects called boxes. The structure of a box is inferred by its type. Some boxes only contain other boxes, whereas most boxes contain data. All data of a file is contained in boxes.

A file can be divided into an initial movie metadata part, contained in a movie box of type 'moov', and a number of incremental movie fragments, contained in movie-fragment boxes of type 'moof'. Each movie fragment extends the movie (multimedia presentation) in time. The movie box and the movie fragment boxes are meta-data boxes containing the information needed by a client to decode and render the media presentation. The actual media data is stored in media-data boxes of type 'mdat'. All these boxes ('moov', 'moof', and 'mdat') are top-level boxes, i.e. contained by the file only and not by any other boxes.

For 3GP-DASH and MPEG DASH, segmented versions of 3GP and MP4 files are used. There are two main types of segments:

Initialization segment: contains a movie box ('moov') but no movie fragments. Media segment: contains one or more movie fragments ('moof') and corresponding media-data in media-data boxe(s) ('mdat') but no movie box.

As described above for HTTP Streaming, a client first needs an MPD, which includes pointers to relevant initialization and media segments. HTTP streaming is then initialized by a client by downloading an initialization segment (or several, in case parallel representations are used for e.g. audio and video). After that the client continues the HTTP streaming session by downloading media segments as described in the MPD.

Pictures are stored as access units in the file format. By default they appear in decoding order in a bitstream. FIG. 4 shows an example where access units are stored in their default bitstream order in a move fragment. There are three temporal levels (0, 1 and 2).

FIG. 4 shows access units with different temporal levels in a fragment in decoding order: I(0), P(4), B(2), B(1), B(3), P(8), B(6), B(5), B(7), etc. The numbers in parentheses denote presentation order, i.e. the order the frames are rendered on the screen: I(0), B(1), B(2), B(3), P(4), B(5), B(6), B(7), P(8), etc. I(0), P(4), P(8), . . . , P(36) are in temporal level 0; B(2), B(6), . . . , B(34) are in temporal level 1; B(1), B(3), B(5), B(7), . . . , B(33), B(35) are in temporal level 2.

If a client wants to download only the samples belonging to a certain temporal level, it needs to issue several HTTP GET byte-range requests in order to avoid downloading more data than necessary. For instance, if the client wants to download temporal level 0, it needs to download access units I(0), P(4), P(8), etc., corresponding to fast forward x4. For ff x2, temporal levels 0 and 1 would be needed, i.e. access units I(0), P(4), B(2), P(8), B(6), etc.

SUMMARY

As mentioned above, the prior art methods for accomplishing trick modes have several drawbacks in terms of decoding complexity and signaling overhead e.g. the issuance of get request.

The object of the embodiments of the present invention is to achieve an improved solution to accomplish trick modes.

The object is achieved by assigning samples within a track to sample groups, wherein all samples within a sample group belong to one temporal level and by allowing the client to access one temporal level independently of lower temporal levels. In this way, the flexibility for the client regarding play out of different frame rates is increased which can result in a lower bandwidth utilization.

According to a first aspect of embodiments of the present invention, a method in a content creator entity for enabling trick modes of a system of files is provided. The system of files comprises at least one initialization segment and at least one media segment, wherein the at least one media segment comprises at least one track having a plurality of media samples and the at least one initialization segment comprises descriptions of the at least one media segment. In the method, media samples within one track having identical temporal levels are identified and the media samples are grouped into sample groups such that all media samples within one sample group have identical temporal levels. The sample groups are marked with temporal level information indicating the temporal level of the samples of the respective sample group in the at least one initialization segment, and information is added in the at least one initialization segment indicating whether the temporal levels can be decoded independently without using samples from the groups of lower temporal levels temporal levels.

According to a second aspect of embodiments of the present invention, a method in a client for enabling trick modes with a desired rate of a system of files is provided. The system of files comprises at least one initialization segment and at least one media segment, wherein the at least one media segment comprises at least one track having a plurality of media samples and the at least one initialization segment comprises descriptions of the at least one media segment. In the method, an initialization segment of a file comprising a description of the at least one media segment is received, wherein the client is configured to identify if information indicating whether the temporal levels can be decoded independently without using samples from the groups of lower temporal levels is included. If information indicating whether the temporal levels can be decoded independently without using samples from the groups of lower temporal levels temporal levels is included, it is then determined which temporal levels that can be decoded independently of other levels. For each segment, it is determined which temporal levels of media segments to be downloaded based on the desired rate and on information which temporal levels can be decoded independently without using samples from the groups of lower temporal levels, the initialization segment to the corresponding media segment is downloaded, the physical locations of the relevant temporal levels within the media segment are determined and the determined temporal levels of the media segment are downloaded.

According to a third aspect of embodiments of the present invention, a content creator entity for enabling trick modes of a system of files is provided. The system of files comprise at least one initialization segment and at least one media segment, wherein the at least one media segment comprises at least one track having a plurality of media samples and the at least one initialization segment comprises descriptions of the at least one media segment. The content creator entity comprises a processor configured to identify media samples within one track having identical temporal levels, to group the media samples into sample groups such that all media samples within one sample group have identical temporal levels, to mark the sample groups with temporal level information indicating the temporal level of the samples of the respective sample group in the at least one initialization segment, and to add information in the at least one initialization segment indicating whether the temporal levels can be decoded independently without using samples from the groups of lower temporal levels temporal levels.

According to a fourth aspect of embodiments of the present invention a client for enabling trick modes with a desired rate of a system of files is provided. The system of files comprise at least one initialization segment and at least one media segment, wherein the at least one media segment comprises at least one track having a plurality of media samples and the at least one initialization segment comprises descriptions of the at least one media segment. The client comprises an input/output section configured to receive an initialization segment of a file comprising a description of the at least one media segment, wherein the client further comprises a processor configured to identify if information indicating whether the temporal levels can be decoded independently without using samples from the groups of lower temporal levels is included and configured to determine which temporal levels that can be decoded independently of other levels and the processor is configured to for each segment determine which temporal levels of media segments to be downloaded based on the desired rate and on information which temporal levels can be decoded independently without using samples from the groups of lower temporal levels. The input/output section is configured to download the initialization segment to the corresponding media segment and the processor is configured to determine the physical locations of the relevant temporal levels within the media segment. Furthermore, the input/output section is configured to download the determined temporal levels of the media segment.

An advantage with embodiments of the present invention is that they are backward-compatible with the existing storage format for H.264 used by 3GP and MP4 files.

DETAILED DESCRIPTION

Accordingly, samples within a track are grouped in hierarchical temporal levels so that a client can deduct a temporal level of samples in a media segment containing one or more movie fragments. This is achieved by using a sample grouping that groups all samples of a track or a track fragment into temporal levels. It should be noted that the temporal level may also be referred to as temporal layer.

As previously mentioned, the frames also referred to as samples can be divided into temporal levels. All samples within one temporal level can only depend on samples within the same temporal level or on samples within lower temporal levels.

According to ISO/IEC 14496-12:2008|15444-12:2008: "Information technology—Coding of audio-visual objects—Part 12: ISO base media file format"|"Information technology—JPEG 2000 image coding system—Part 12: ISO base media file format", a sample grouping is an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping has a type field to indicate the type of grouping. For example, a file might contain two sample groupings for the same track: one based on an assignment of sample to a temporal level and another to subsequences.

Sample groupings are represented by two linked data structures: (1) a SampleToGroup box represents the assignment of samples to sample groups; (2) a SampleGroupDescription box contains a sample group entry for each sample group describing the properties of the group. There may be multiple instances of the SampleToGroup and SampleGroupDescription boxes based on different grouping criteria. These are distinguished by a type field used to indicate the type of grouping. Support for Sample Group structures within Movie fragments is provided by the use of the SampleToGroup Box with the container for this Box being the Track Fragment Box ('traf').

The SampleToGroup Box can be used to find the group that a sample in a track fragment belongs to and the associated description of that sample group. The table is compactly coded with each entry giving the index of the first sample of a run of samples with the same sample group descriptor. The sample group description ID is an index that refers to a SampleGroupDescription Box, which contains entries describing the characteristics of each sample group and present in the SampleTableBox. There may be multiple instances of the SampleToGroup Box if there is more the one sample grouping for the samples in a track fragment. Each instance of the SampleToGroup Box has a type code that distinguishes different sample groupings. The associated SampleGroupDescription shall indicate the same value for the grouping type.

Figure 1:
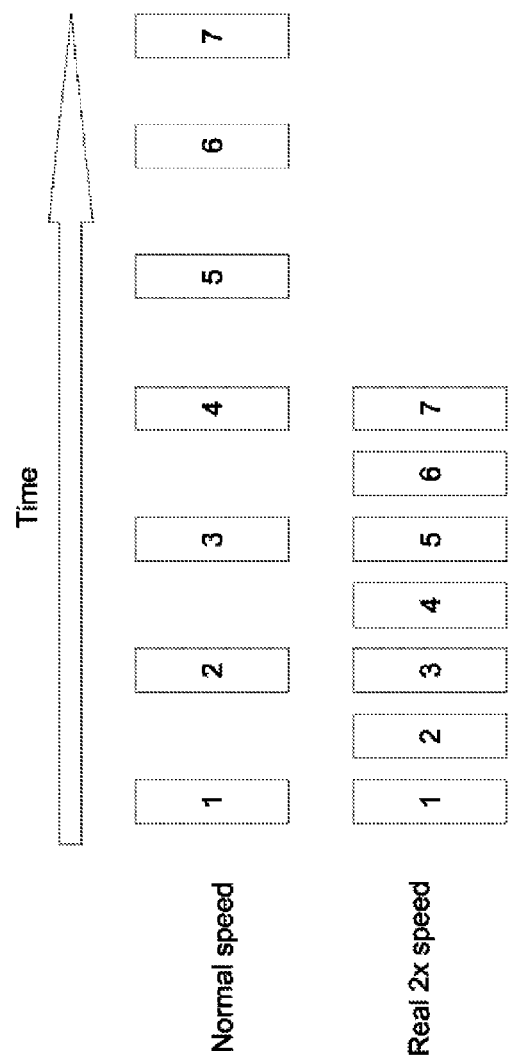
FIG. 1 illustrates normal speed and fast forward by playing at higher speed according to prior art.
Figure 2:
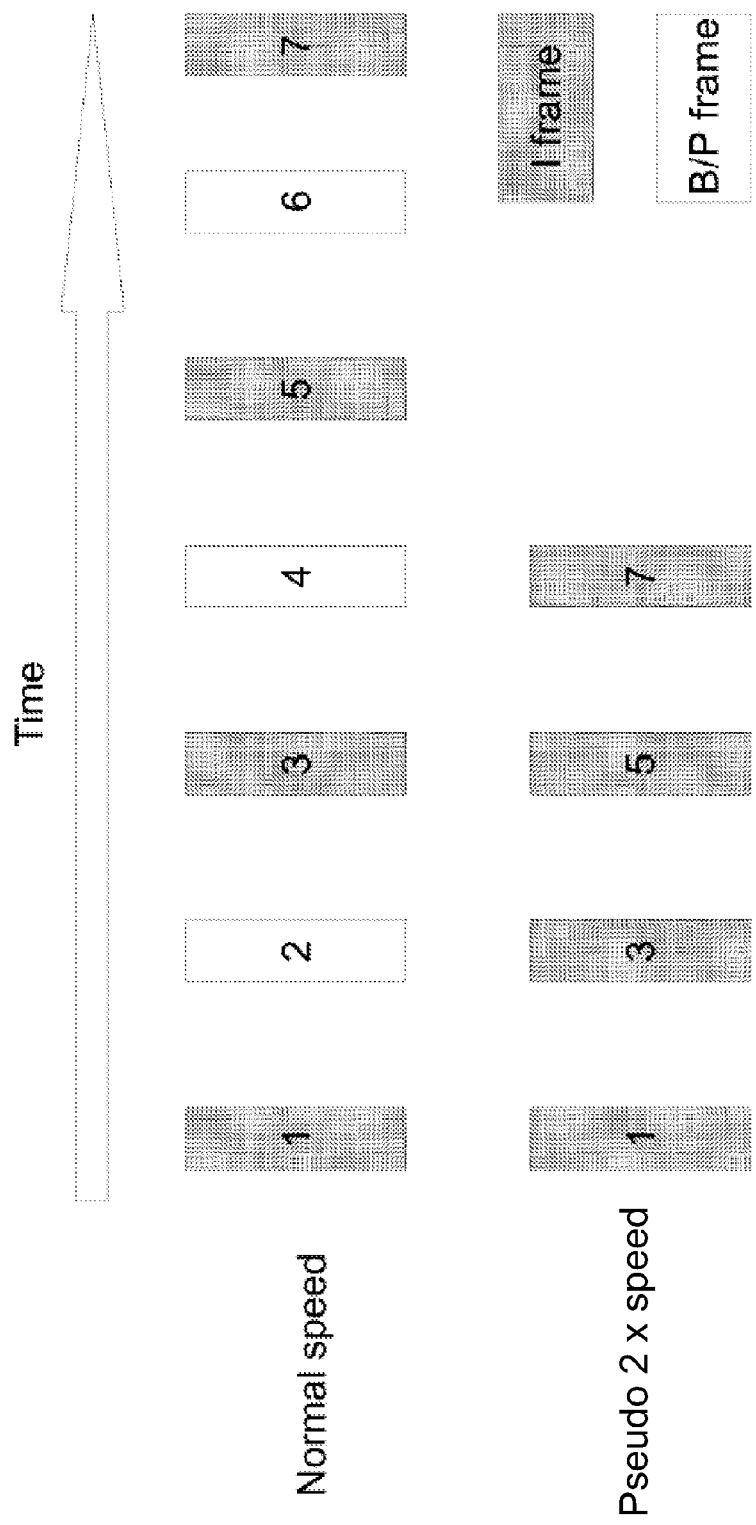
FIG. 2 illustrates normal speed and fast forward by skipping B/P frames according to prior art.
Figure 3:
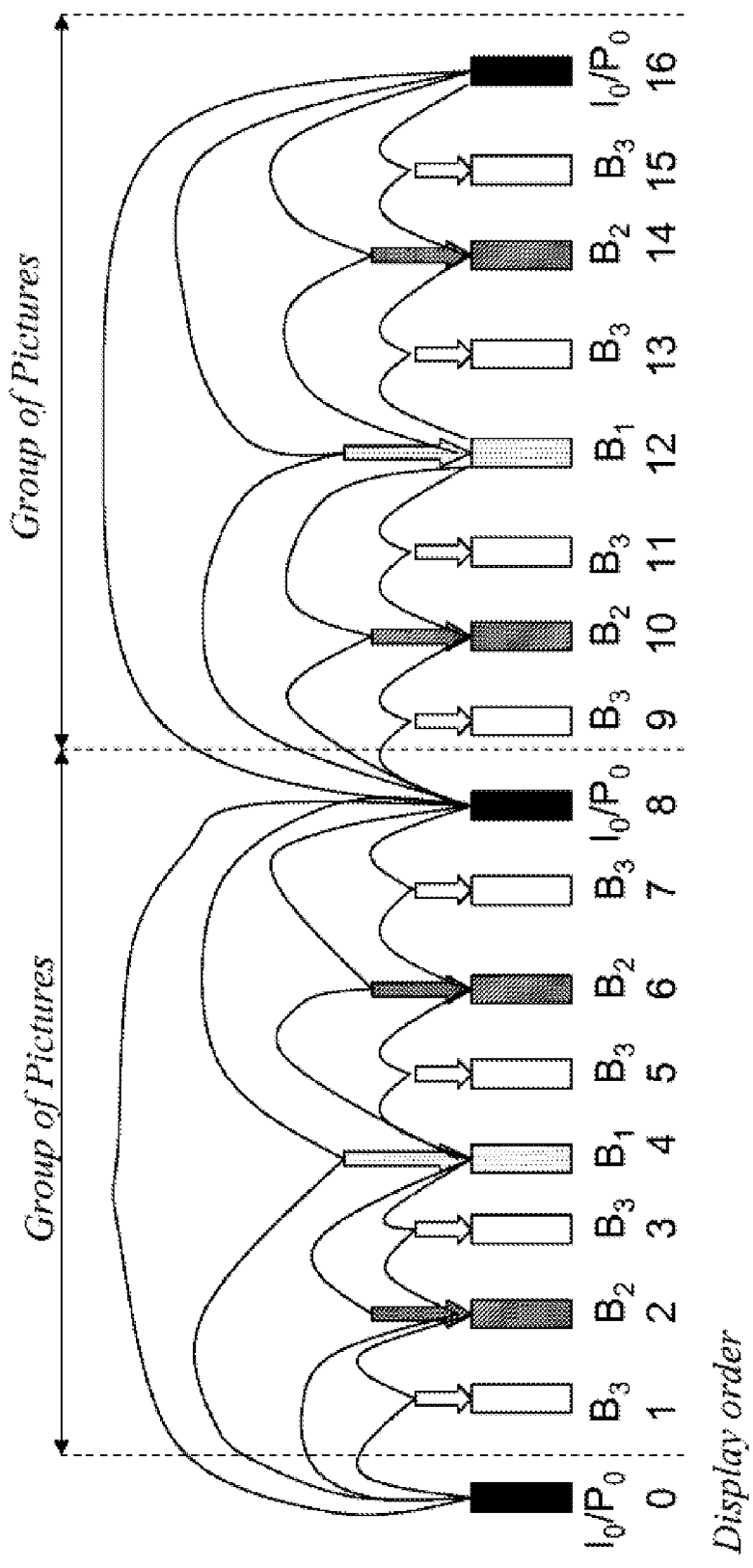
FIG. 3 illustrates hierarchical B picture coding for temporal scalability according to prior art.
Figure 4:
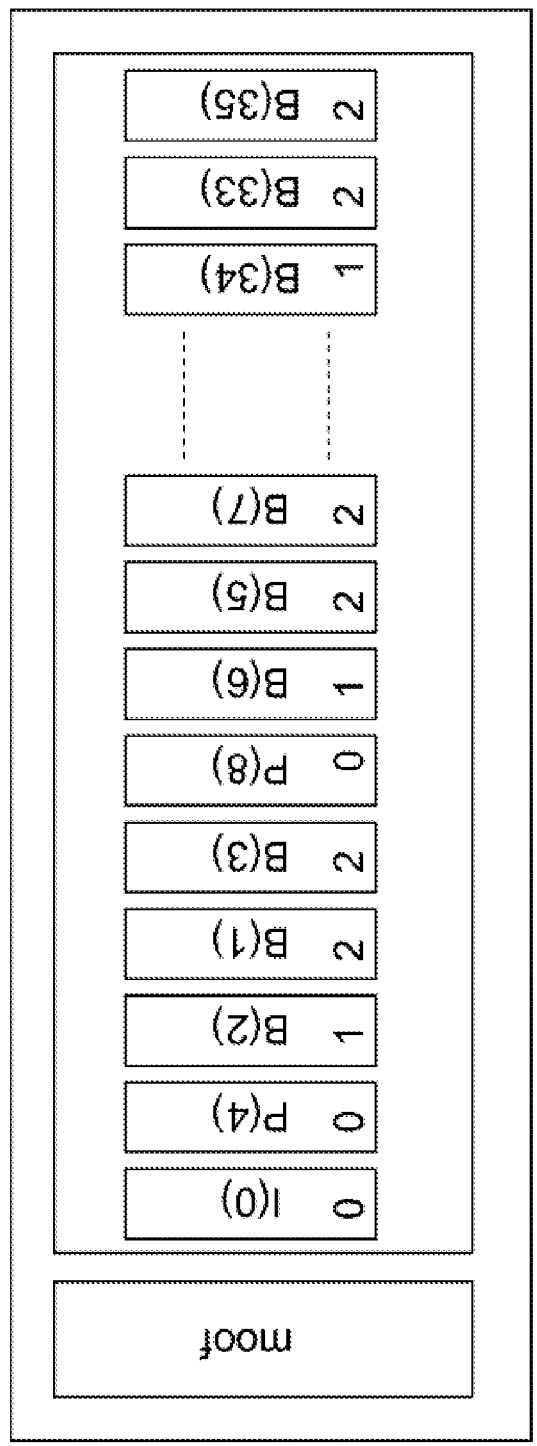
FIG. 4 illustrates samples with different temporal levels in a fragment in decoding order according to prior art.
Figure 5A:
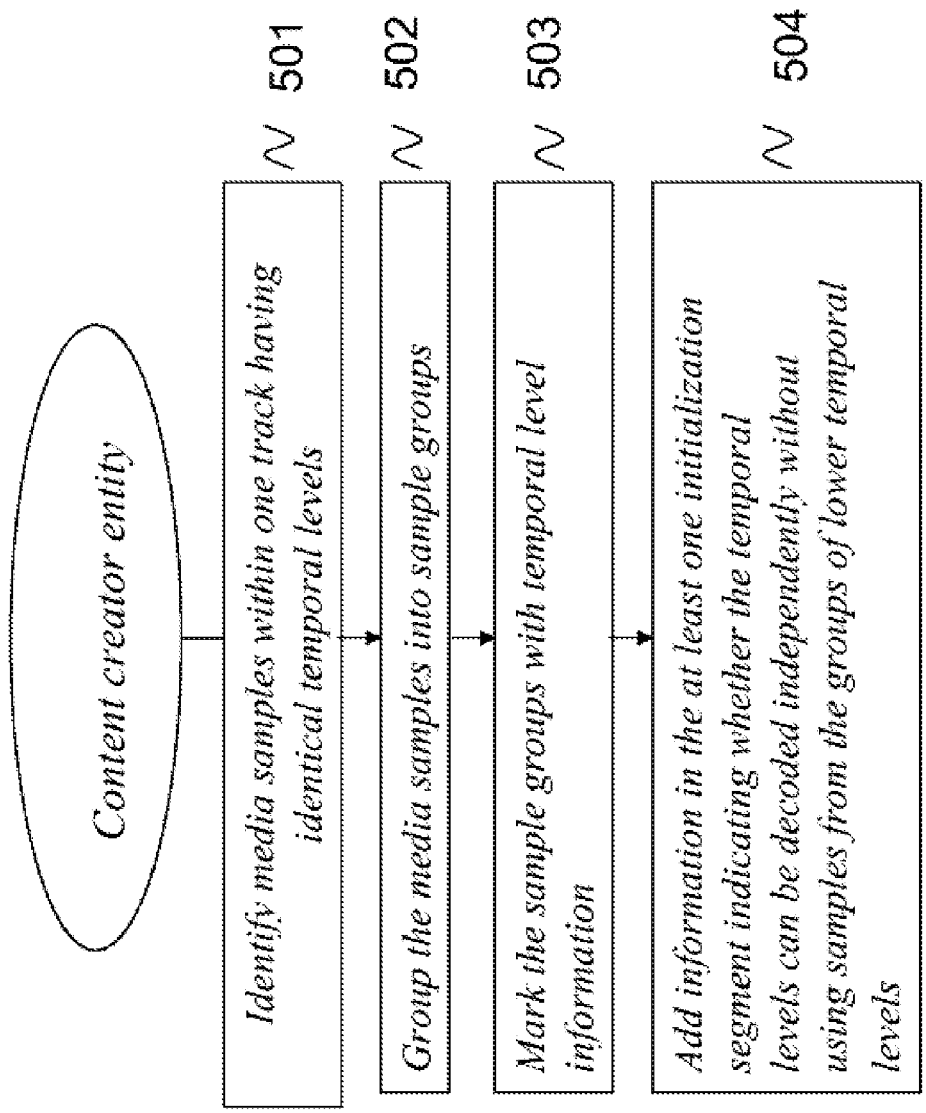
FIG. 5a shows a flowchart illustrating the method in a content creator according to embodiments of the present invention.

According to a first aspect of embodiments of the present invention, a method in a content creator entity for enabling trick modes of a system of files is provided. The system of files comprises at least one initialization segment and at least one media segment, wherein the at least one media segment comprises at least one track having a plurality of media samples and the at least one initialization segment comprises descriptions of the at least one media segment. As illustrated in the flowchart of FIG. 5a, the method comprises:

501. Media samples within one track having identical temporal levels are identified.

502. The media samples are grouped into sample groups such that all media samples within one sample group have identical temporal levels.

503. The sample groups are marked with temporal level information indicating the temporal level of the samples of the respective sample group in the at least one initialization segment.

504. Information in the at least one initialization segment is added indicating whether the temporal levels can be decoded independently without using samples from the groups of lower temporal levels temporal levels.

According to one embodiment the temporal level information is associated with a sample grouping type and the temporal level information may be a sample group description index.

Furthermore, the information whether the temporal level can be decoded independently without using samples from the groups of lower temporal levels is comprised in the sample group description according to a further embodiment. The sample group definition ('tele') below indicates this information for each level (group).

```
class TemporalLevelEntry( ) extends SampleGroupDescriptionEntry('tele')
{
    bit(1)    level_independently_decodable;
    bit(7)    reserved=0;
}
```

By adding the information indicating whether the temporal levels can be decoded independently without using samples from the groups of lower temporal levels the flexibility in terms of alternative frame rates is increased.

Figure 5B:
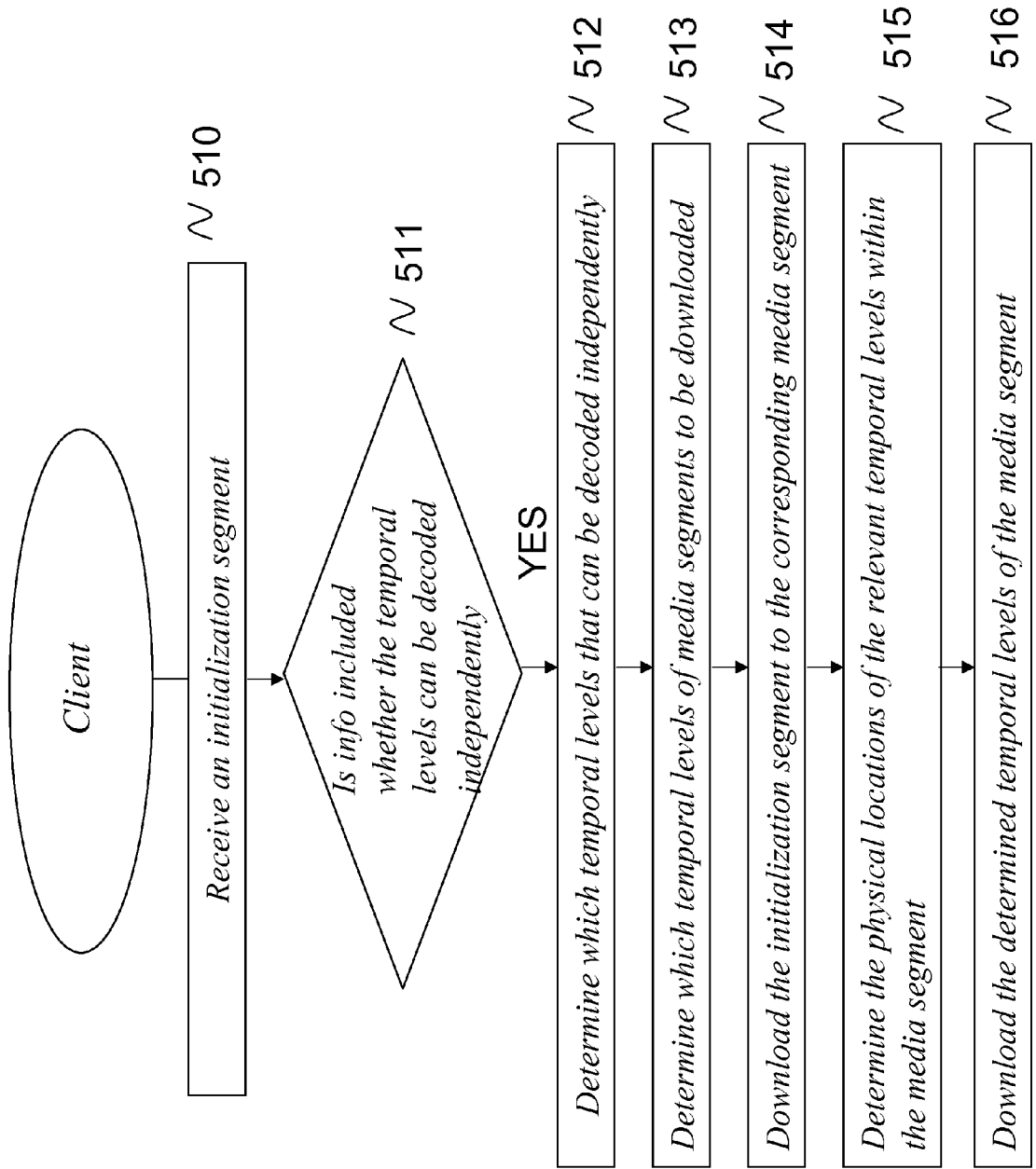
FIG. 5b shows a flowchart illustrating the method in a client according to embodiments of the present invention.

According to a second aspect of embodiments of the present invention a method in a client is provided. The method comprises the following steps which are illustrated in the flowchart of FIG. 5b.

In a first step 510, receive an initialization segment of a file comprising sample group description, wherein the client is configured to identify if information indicating whether the temporal levels can be decoded independently without using samples from the groups of lower temporal levels is included.

If information indicating whether the temporal levels can be decoded independently 511 without using samples from the groups of lower temporal levels temporal levels is included, then determine 512 which temporal levels that can be decoded independently of other levels.

Then determine 513 which levels of media segments to be downloaded based on the desired rate and on information which temporal levels can be decoded independently without using samples from the groups of lower temporal levels.

508. Download the initialization segment to the corresponding media segment and determine the physical locations of the relevant temporal levels within the media segment.

Download 514 the determined temporal levels of the media segment.

Repeat 516 steps 507-509 for each segment.

Figure 6:
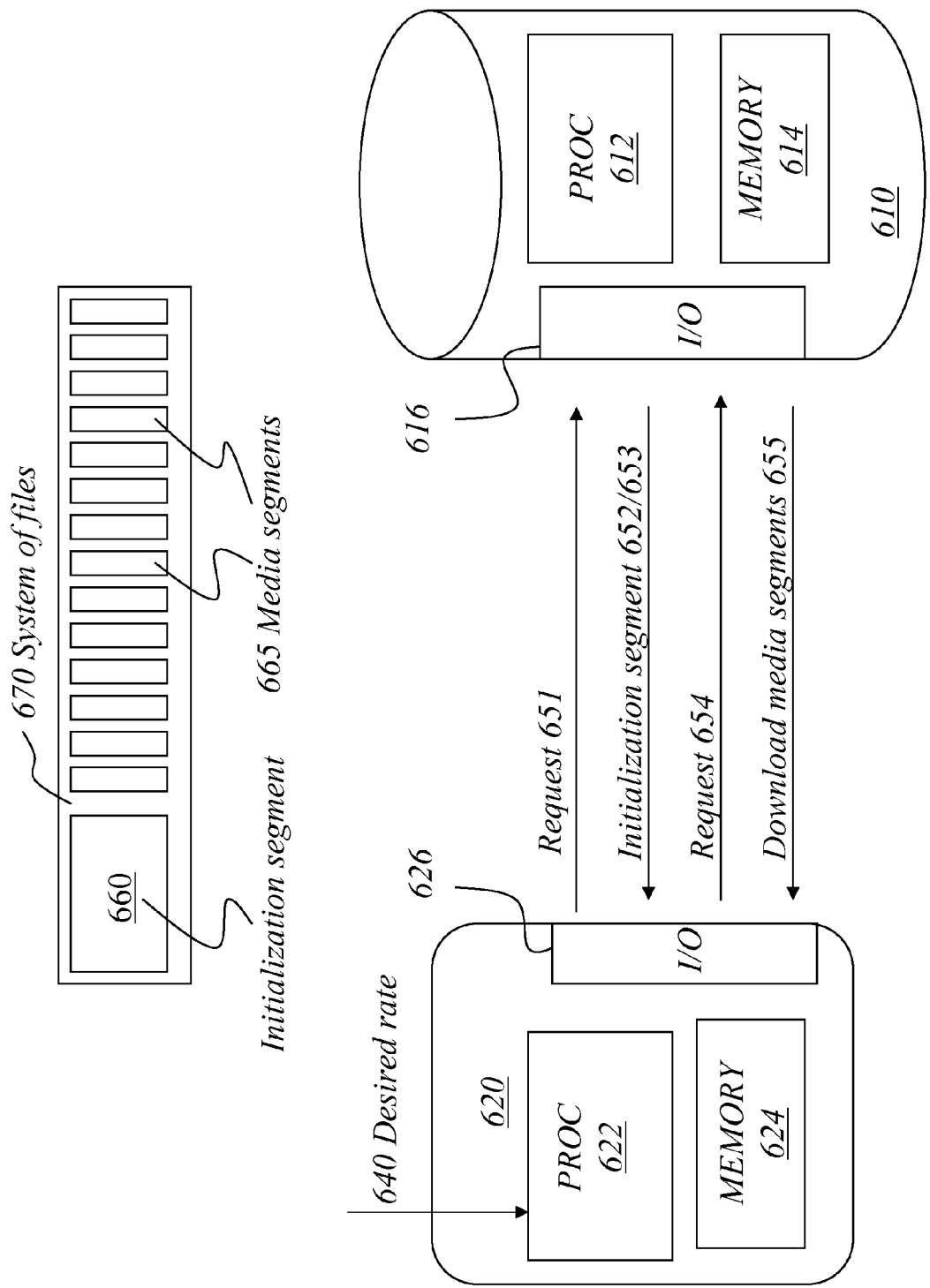
FIG. 6 illustrates schematically a client and a content creator entity according to embodiments of the present invention.

Turning now to FIG. 6, the system of files comprising the initialization segment 660 and the media segments 665 is created by the media content creator entity 610 according to the embodiments of the present invention. The content creator entity 610 comprises a processor 612, a memory 614 and an input/output section 616 for sending and receiving messages. The processor 612 is configured to perform the content creator entity functions described herein and the memory 614 is configured to e.g. store the initialization segment with the file description and media segments. The client 620 comprises a processor 622, a memory 624 and an input/output section 626 for sending and receiving messaged. The processor 622 is configured to perform the client functions described herein and the memory 624 is configured to e.g. store the initialization segment with the file description and media segments. Examples of a media content creator 610 are TV operator and telecommunication operator and examples of clients 620 are PCs, set-top-boxes, mobile phones, pads, and TV sets.

As illustrated in FIG. 6, a client 620 sends 651 a request for the initialization segment 660 from the system of files 670. The content creator entity 610 sends 652 the requested initialization segment 660 and the client 620 receives 653 the initialization segment 660 with the file description information contained in a movie box of type 'moov'. Based on the file description information and a desired rate 640 of the client, the client requests 654 different media segments 665. The media segments correspond to the samples ordered into sample groups according to the temporal level. Then the requested media segments 665 are downloaded 655 by the client 620.

Figure 7:
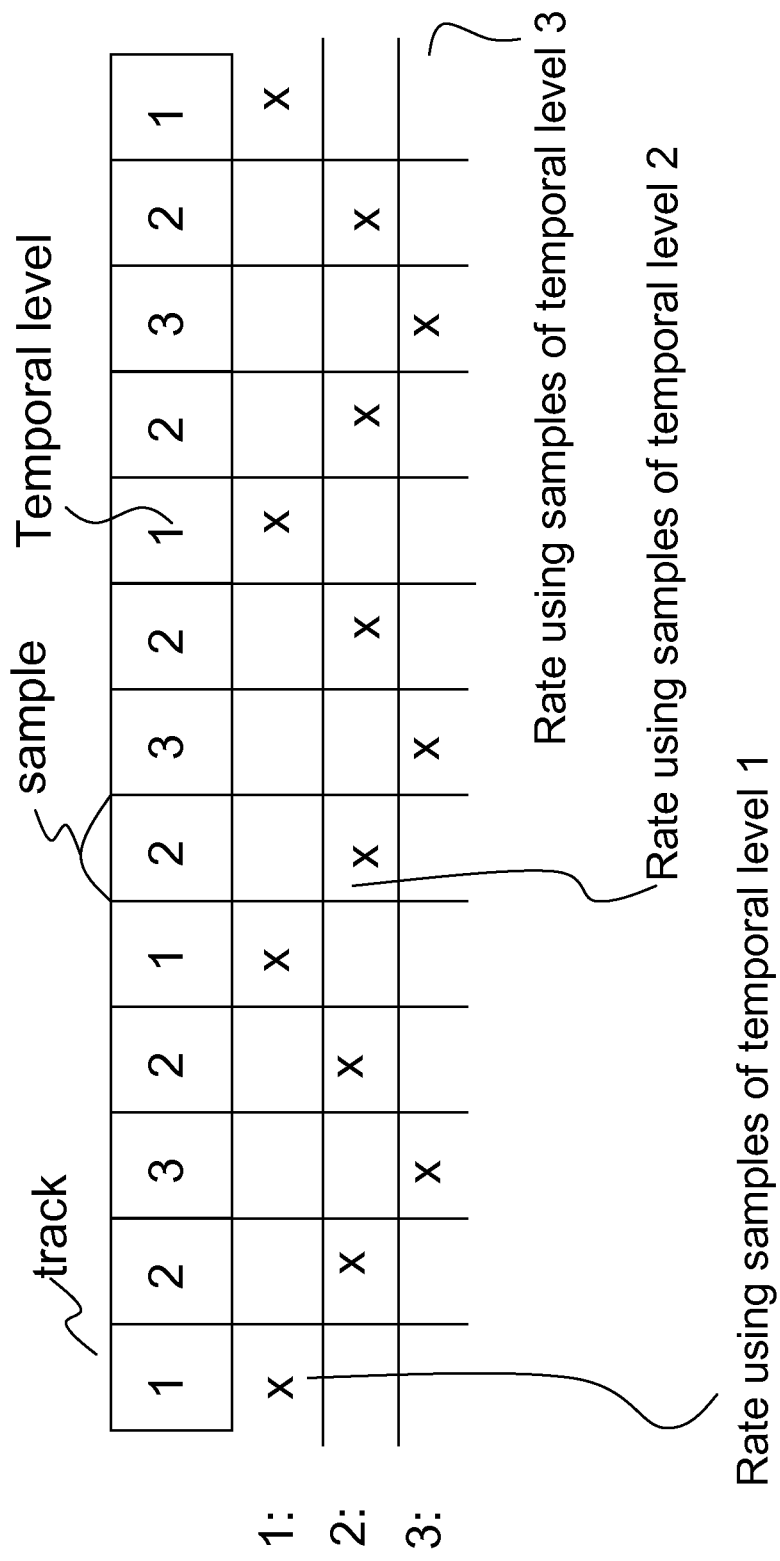
FIG. 7 illustrates a track with a plurality of samples divided into sample groups according to embodiments of the present invention.

To further exemplify the embodiments of the present invention FIG. 7 is provided. FIG. 7 shows a track with samples of different temporal levels 1, 2 and 3. It can be seen from FIG. 7, that using samples of temporal level 1 provide one rate, samples of temporal level 2 provide another rate and samples of temporal level 3 provide yet another rate. In the prior art solutions it is being assumed that samples of a temporal level are dependent on samples of lower temporal levels. By using the embodiments of the present invention it is possible to only use samples of e.g. temporal level 2 or 3 in addition to samples of e.g. both temporal levels 2 and 1. Hence by allowing samples of one temporal level to be used independently of samples of lower temporal levels, the flexibility regarding the number of possible rates is increased and more alternative rates can be provided to achieve trick modes.

The information indicating whether the temporal levels can be decoded independently without using samples from the groups of lower temporal levels can also be useful when only I frames are used to accomplish the trick modes. The I frames are divided into different temporal levels, e.g. every other I frame is on temporary level 1 and every other I frame is on temporal level 2. Since the I frames are not dependent on any other frames, the information according to the embodiments of the present invention indicating whether the temporal levels can be decoded independently without using samples from the groups of lower temporal levels temporal levels can be used to select a group of I frames for accomplishing a trick mode to provide a certain rate. Thus, although there is no dependence between the I frames the parameter originally intended for indicating dependence between temporal levels can be used for indicating that only a part of the I frames should be used which increases the flexibility.

Another example of a bitstream in temporal levels is to have regular I (Intra) frames with P (prediction) frames (P) in between, e.g., $I_0 P_1 P_2 P_3 I_4 P_5 P_6 P_7 I_8 P_9 P_{10} P_{11}$ in decoding order. In this case the media container (mdat) can be temporally ordered by just moving the I frames ahead of the P frames such that one level can be downloaded in an easier way:

$I_0 I_8 I_4 P_1 P_2 P_3 P_5 P_6 P_7 P_9 P_{10} P_{11}$

Note that the Intra frames are ordered in a hierarchical manner to allow for double Intra-speed, followed by single Intra speed. Hence in this example there are two temporal levels for I frames and one for I and P frames:

ff x8 is achieved by using pictures $I_0, I_8, I_{16}, I_{24}$, etc corresponding to a basic level, e.g. level 1, ff x4 is achieved by using pictures $I_0, I_4, I_8, I_{12}$, etc corresponding to the basic level and one level above, e.g. levels 1 and 2, normal playback corresponds to all pictures $I_0, P_1, P_2, P_3, I_4, P_5, P_6, P_7$, etc corresponding to all levels, e.g. levels 1, 2 and 3.

A logical decode order for the sample numbers can now be achieved by using one Track Run for each I and one for the following 3 Ps in the Track Fragment box:

trun[$I_0$] trun[$P_1 P_2 P_3$] trun[$I_4$] trun[$P_5 P_6 P_7$] trun[$I_8$] trun[$P_9 P_{10} P_{11}$]

where each trun points to the data in the temporally ordered media container (mdat) described above.

Hence, by dividing samples into different temporal levels it makes it possible for a client to limit the required bandwidth by only downloading samples of some temporal levels. Furthermore, by adding the possibility to signal that one or more temporal levels can be used independently of others, the granularity of the required bandwidth is increased since the flexibility of selecting samples of different temporal levels to be downloaded is increased.

According to one embodiment, the temporal level information is associated with a sample grouping type. According to a further embodiment, the sample grouping type is a sample group description index. That implies that the temporal level of samples within one sample group is indicated as a sample description index.

Moreover, the information whether the temporal level can be decoded independently without using samples from the groups of lower temporal levels is comprised in the sample group description index according to a further embodiment.

As an example, a grouping type associated with the temporal level referred to as 'tele' is introduced to group all samples based on the temporal level of the samples. A Sample-To-Group box (sbgp) contained in the Track Fragment box (traf) defines the sample grouping according to this grouping type according to one embodiment. The group description index corresponds to the temporal level and typically takes contiguous values such as 1, 2, 3 etc.

In other embodiments, further information regarding the temporal level is supplied in accompanying sample group descriptions for e.g. the 'tele' grouping type:

```
class TemporalLevelEntry( )
    extends SampleGroupDescriptionEntry('tele') {
    unsigned int(8) rate_factor;
    unsigned int(32) data_offset;
}
``` where:
the parameter rate_factor is a positive integer corresponding to the increased time progression one achieves by playing all samples of the current and lower temporal levels at the original sample rate. Note that the temporal level may be the group description index.

the parameter data_offset is an integer pointing to the start of the first sample relative to the start of the containing file with the temporal level of this group description.

Furthermore, the parameter data_offset may be added to the implicit or explicit data_offset established in a Track Fragment Header box, and/or the parameter data_offset may be omitted in the sample group descriptions.

According to another alternative, the temporal level can be explicitly included in the sample group descriptions as an integer value instead of being the same as the group description index, and/or the temporal level may also correspond to the group description index minus 1, or any other integer.

In yet another embodiment of this invention, the presence of the brand 'tele' in the Segment Type box (styp) of the media segment signals that the media data of the segment is grouped such that samples of a lower temporal level precede those of a higher temporal level. A sample grouping as described above gives in this case further information to the client on the number of levels and their locations in the file.

The presence of the brand 'tele' in styp of the media segment gives an early indication to the client if the media segment carrries the information about temporally ordered levels at all. The brands are signalled first in a segment, so if the client starts downloading a segment it can very quickly check if it makes sense to look for temporal level information later in the segment.

The invention claimed is:

1. A method in a content creator computing device for enabling trick modes of a system of files, the files comprising at least one initialization segment and at least one media segment, wherein the at least one media segment comprises at least one track having a plurality of media samples and the at least one initialization segment comprises descriptions of the at least one media segment, the method comprising:
   identifying media samples within one track having identical temporal levels;
   grouping the media samples into sample groups such that all media samples in a sample group have identical temporal levels;
   marking the sample groups with temporal level information indicating the temporal level of the media samples of the respective sample group in the at least one initialization segment;
   adding information to the at least one initialization segment that indicates at least one sample group that has a temporal level greater than zero that can be decoded independently without using samples having lower temporal levels; and
   transmitting the at least one initialization segment to a client computing device to enable selective download and trick modes for the sample groups.

2. The method of claim 1, wherein the temporal level information is associated with a sample grouping type.

3. The method of claim 2, wherein the temporal level information is a sample group description index.

4. The method of claim 3, wherein the sample group description index comprises a rate_factor parameter which is a positive integer indicative of an increased time progression that is achievable for a given sample group having a given temporal level by playing all samples having the given temporal level and samples having lower temporal levels at an original sample rate.

5. The method of claim 3, wherein the sample group description index comprises a data_offset parameter that is an integer pointing to a start of a first sample relative to a start of a media segment with the temporal level of the sample.

6. The method of claim 1, wherein the added information is included in a sample group description.

7. The method of claim 1, wherein a predefined parameter in a Segment Type box (STYP) of the media segment is used to signal that samples of the media segment are grouped such that samples of a lower temporal level precede those of a higher temporal level.

8. A content creator entity for enabling trick modes of a system of files, the files comprising at least one initialization segment and at least one media segment, wherein the at least one media segment comprises at least one track having a plurality of media samples and the at least one initialization segment comprises descriptions of the at least one media segment, the content creator entity comprising:
   a processor configured to:
      identify media samples within one track having identical temporal levels;
      group the media samples into sample groups such that all media samples in a sample group have identical temporal levels;
      mark the sample groups with temporal level information indicating the temporal level of the samples of the respective sample group in the at least one initialization segment; and
      add information to the at least one initialization segment that indicates at least one sample group that has a temporal level greater than zero that can be decoded independently without using samples having lower temporal levels; and
      transmit the at least one initialization segment to a client computing device to enable selective download and trick modes for the sample groups.

9. The content creator entity of claim 8, wherein the temporal level information is associated with a sample grouping type.

10. The content creator entity of claim 9, wherein the temporal level information is a sample group description index.

11. The content creator entity of claim 10, wherein the sample group description index comprises a rate_factor parameter which is a positive integer indicative of an increased time progression that is achievable for a given sample group having a given temporal level by playing all samples having the given temporal level and samples having lower temporal levels at an original sample rate.

12. The content creator entity of claim 10, wherein the sample group description index comprises a data_offset parameter that is an integer pointing to a start of a first sample relative to a start of a media segment with the temporal level of the sample.

13. The content creator entity of claim 8, wherein the added information is included in a sample group description.

14. The content creator entity of claim 8, wherein a predefined parameter in a Segment Type box (STYP) of the media segment is used to signal that samples of the media segment are grouped such that samples of a lower temporal level precede those of a higher temporal level.

* * * * *